US005720094A

United States Patent [19]

Carter et al.

[11] Patent Number: 5,720,094

[45] Date of Patent: Feb. 24, 1998

[54] METHOD AND APPARATUS FOR PRE-CREEPING A GREATER THAN REQUIRED STRENGTH BLADE DEVICE

[75] Inventors: Daniel L. Carter, Scottsville; Geoffrey C. Williams, Penfield, both of N.Y.

[73] Assignee: Xerox Corporation, Stamford, Conn.

[21] Appl. No.: 560,777

[22] Filed: Nov. 21, 1995

[51] Int. Cl.[6] .............................. B65D 85/84; B23P 11/02; B21D 31/00

[52] U.S. Cl. .............................. 29/446; 206/523; 72/379.2

[58] Field of Search .............................. 29/446, 896.8, 29/896.9; 206/523, 524; 72/379.2; 264/320, 339

[56] References Cited

U.S. PATENT DOCUMENTS

| | | | |
|---|---|---|---|
| 4,373,371 | 2/1983 | Liu | 72/379.2 |
| 5,277,723 | 1/1994 | Kodama et al. | 264/320 |
| 5,300,335 | 4/1994 | Miyazawa et al. | 264/320 |
| 5,311,760 | 5/1994 | Thompson | 72/379.2 |
| 5,395,565 | 3/1995 | Nagaoka et al. | 264/320 |

FOREIGN PATENT DOCUMENTS

| | | | |
|---|---|---|---|
| 2197810 | 6/1988 | United Kingdom | 72/379.2 |

*Primary Examiner*—David P. Bryant
*Assistant Examiner*—Tisa Stewart
*Attorney, Agent, or Firm*—Tallam I. Nguti

[57] ABSTRACT

Method and apparatus for pre-creeping a force applying spring blade member having characteristics for ordinarily generating a higher than required initial force in a controlled force applying process. The apparatus includes a retainer that can be packed and sealed within storable container. The retainer includes a first set of walls defining a first slot for receiving and retaining a first edge of a generally rectangular spring blade member, and a second set of walls defining a second slot for receiving and retaining a second and opposite edge of the blade member. The second slot is in communication, and forms a blade creeping angle, with the first slot. The blade creeping angle and a controlled aging period of time for a packaged blade member are selected so as to cause the blade member to precreep through a precreep phase during the controlled period of time in accordance with a bend induced therein at the blade creeping angle. The precreeped blade member can then be mounted within the controlled force applying process to generate an initial high desired force within a desired force range of the process, and to thereafter exhibit a reduced creep rate over a life of the blade member in the process, thus resulting a longer blade life.

3 Claims, 5 Drawing Sheets

METHOD AND APPARATUS FOR PRE-CREEPING A GREATER THAN REQUIRED STRENGTH BLADE DEVICE

BACKGROUND OF THE INVENTION

The Present Application is related in subject matter to and cross-referenced with both U.S. Pat. No. 5,613,179 which application is attributable to the same Applicants as the Present Application, and both of which applications were filed on the same day as the Present Application.

This invention relates to flexible force applying blade devices, and more particularly to a method and apparatus for pre-creeping a spring blade device having a greater than required initial strength for use as an image transfer assist blade in an electrostatographic reproduction machine.

Generally, the process of electrostatographic reproduction includes uniformly charging an image frame of a moving image bearing member, or photoreceptor, to a substantially uniform potential, and imagewise discharging it or imagewise exposing it to light reflected from an original image being reproduced. The result is an electrostatically formed latent image on the image frame of the image bearing member. For multiple original images, several such frames are similar imaged. The latent image so formed on each frame is developed by bringing a charged developer material into contact therewith. Two-component and single-component developer materials are commonly used. A typical two-component developer material comprises magnetic carrier particles, also known as "carrier beads," having fusable charged toner particles adhering triboelectrically thereto. A single component developer material typically comprises charged toner particles only.

In either case, the fusable charged toner particles when brought into contact with each latent image, are attracted to such latent image, thus forming a toner image on the image bearing member. The toner image is subsequently transferred at an image transfer station of the machine to an image receiver copy sheet. The copy sheet is then passed through a fuser apparatus where the toner image is heated and permanently fused to the copy sheet to form a hard copy of each of the original images.

In some reproduction machines, it is well known to use a force applying blade device at the transfer station of the reproduction machine for applying a force to the backside of the copy sheet in order to assist image transfer from the image bearing member to the copy sheet. In order to be effective, the transfer assist blade must be able to apply a uniform and precise force so as not to stall the copy sheet or smear unfused toner images being transferred to the copy sheet. The force must be uniform and precise so as not to create voids or deletions in areas with insufficient backside transfer assist force.

For example, a uniformly applied force ranging from an initial force of about 0.91 lb. when a blade device is newly installed, and dropping to 0.50 lb. towards the end of the life of the blade device, have been found to be effective as transfer assist forces in some reproduction machines. Unfortunately however, a conventional blade device ordinarily designed to have just sufficient strength for providing forces within such a range, starting with an initial force of about 0.91 lb., has an undesirably short life of less than about 2000 hours in such an application. Typically, the practice has been to replace such a blade device within the 2000 hours of its life before its applied force drops to a non-effective point below 0.5 lb. Such replacement is usually in the field, and by a technician, and is therefore costly and undesirable.

On the other hand, a similar blade device designed to have a greater than initial required strength or force, (although having a desirably and relatively longer life), undesirably and detrimentally, upon installation in the machine, tends to cause copy sheets to stall, and image smearing at the image transfer station of the reproduction machine.

There has therefore been a need for an effective and less costly method and apparatus for producing a relatively longer life blade device for use as a transfer assist blade at the transfer station of reproduction machines.

SUMMARY OF THE INVENTION

In accordance with one aspect of the present invention, there is provided an apparatus for pre-creeping a force applying spring blade member having characteristics for generating a higher than required initial force in a force applying process. The apparatus includes a storable container, and a retainer that can be packed and sealed within the storable container. The retainer includes a first set of walls defining a first slot for receiving and retaining a first edge of a generally rectangular spring blade member, and a second set of walls defining a second slot for receiving and retaining a second and opposite edge of the blade member. The second slot is in communication, and forms a blade creeping angle, with the first slot so as to cause the blade member to creep over time according to a bend induced therein at the blade creeping angle.

Pursuant to another aspect of the present invention, there is provided a method of increasing effective blade life in a force applying process that requires precise forces to be applied within a desired force range, and that utilizes a blade member which is bendable at various radii of curvature, including a beginning radius of curvature for applying a high desired beginning force within the desired force range, and an ending radius of curvature for applying a relatively lower desired ending force at the end of a useful life of the blade member. The method includes first selecting a generally rectangular spring blade member having characteristics for generating an out-of-range beginning force that is greater than the high desired beginning force of the desired force range when bent at a radius equal to the beginning radius of curvature in the force applying process. The method next includes packaging the selected spring blade member into a rigid retainer having a cavity for containing the selected spring blade member curved or bent at a radius of curvature equal approximately to the beginning radius of curvature in the process, and aging the blade member as packaged for a significant period of time in order to allow the blade member to creep until its beginning force when curved as such is caused to drop from a value equal to the greater out-of-range beginning force thereof to a value equal to the high desired beginning force within the desired force range. The method then includes mounting the aged blade member at a beginning radius of curvature within the force applying process for initially generating a force equal to the high desired beginning force, and subsequently at various other radii of curvature over a relatively increased blade life time thereof, before mounting it at an ending radius of curvature for generating a relatively lower desired ending force within the process.

Other features of the present invention will become apparent from the following drawings and description.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Inasmuch as the art of electrophotographic reproduction is well known, the various processing stations employed in the FIG. 6 reproduction machine will be shown hereinafter schematically and their operation described briefly with reference thereto.

Figure 6:
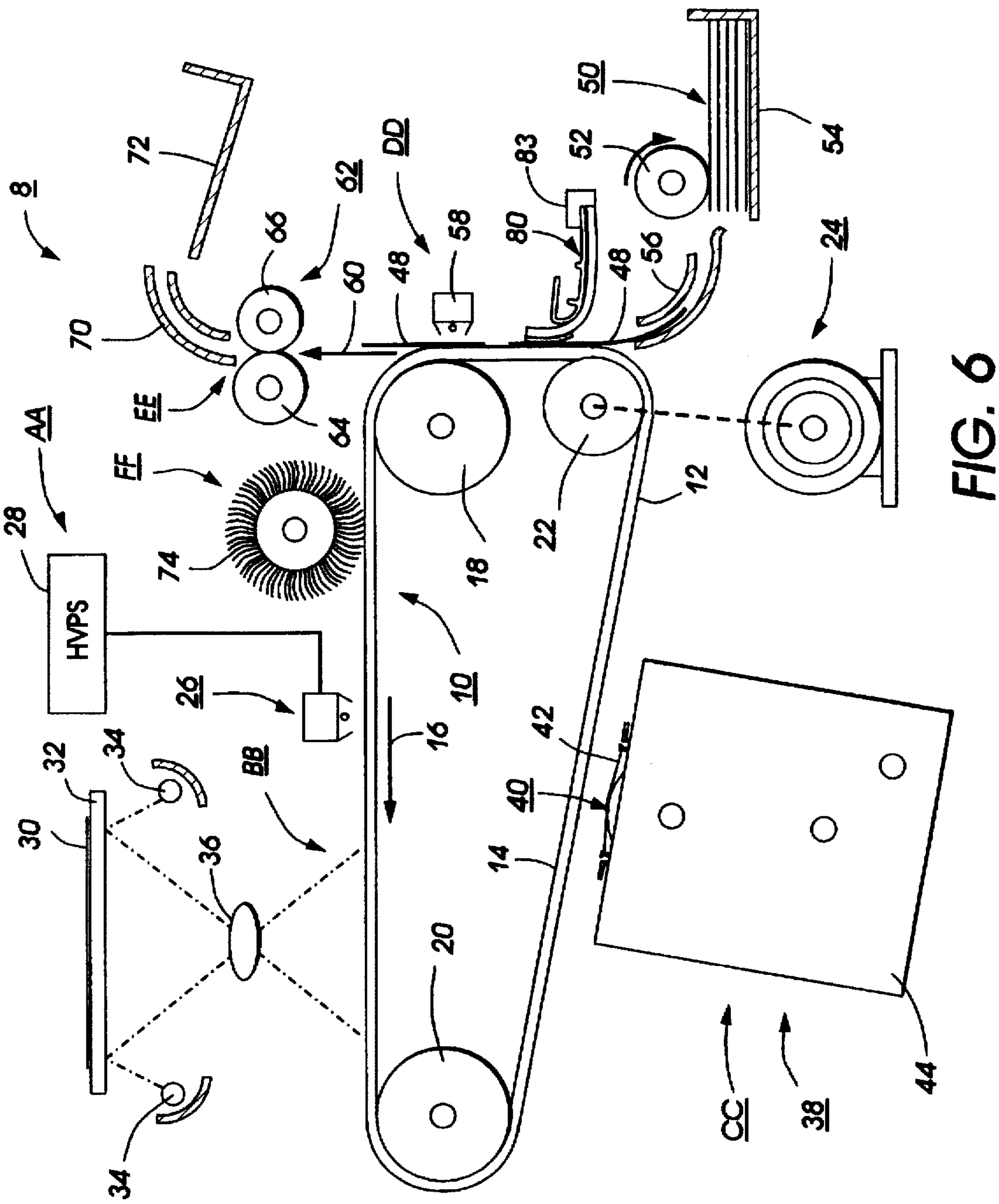
FIG. 6 is a schematic elevational view of an illustrative electrophotographic reproduction machine incorporating a greater than required strength blade device pre-crept in accordance with the FIG. 1 method and apparatus of the present invention.

Referring initially to FIG. 6 there is shown an illustrative electrophotographic reproduction machine incorporating the development apparatus of the present invention therein. The electrophotographic reproduction machine employs a belt 10 having a image bearing surface 12 deposited on a conductive substrate 14. Preferably, image bearing surface 12 is made from a selenium alloy. Conductive substrate 14 is made preferably from an aluminum alloy which is electrically grounded. Belt 10 moves in the direction of arrow 16 to advance successful portions of image bearing surface 12 sequentially through the various processing stations disposed about the path of movement thereon. Belt 10 is entrained about stripping roller 18, tensioning roller 20 and drive roller 22. Drive roller 22 is mounted rotatably in engagement with belt 10. Motor 24 rotates rotates roller 22 to advance belt 10 in the direction of arrow 16. Roller 22 is coupled to motor 24 by suitable means such as a drive belt. Belt 10 is maintained in tension by a pair of springs (not shown) resiliently urging tensioning roller 20 against belt 10 with the desired spring force. Stripping roller 18 and tensioning roller 20 are mounted to rotate freely.

Initially, a portion of belt 10 passes through charging station AA. At charging station AA, a corona generating device, indicated generally by the reference numeral 26, charges image bearing surface 12 to a relatively high, substantially uniform potential. High voltage power supply 28 is coupled to corona generating device 26. Excitation of power supply 28 causes corona generating device 26 to charge image bearing surface 12 of belt 10. After image bearing surface 12 of belt 10 is charged, the charged portion thereof is advanced through exposure station BB.

At exposure station BB, an original document 30 is placed face down upon a transparent platen 32. Lamps 34 flash light rays onto original document 30. The light rays reflected from original document 30 are transmitted through lens 36 to form a light image thereof. Lens 36 focuses the light image onto the charged portion of image bearing surface 12 to selectively dissipate the charge thereon. This records an electrostatic latent image on image bearing surface 12 which corresponds to the informational areas contained within original document 30. One skilled in the art will appreciate that in lieu of a light lens system, a raster output scanner may be employed. The raster output scanner (ROS) uses a modulated laser light beam to selectively discharge the charged image bearing surface 12 as to record the latent image thereon. In the event a reproduction system is being employed, the modulation of the ROS is controlled by an electronic subsystem coupled to a computer. Alternatively, in the event a digital copier is being used, a raster input scanner may scan an original document to convert the information contained therein to digital format which, in turn, is employed to control the ROS.

After the electrostatic latent image has been recorded on image bearing surface 12, belt 10 advances the latent image to development station CC. At development station CC, a developer unit, indicated generally by the reference numeral 38, develops the latent image recorded on the image bearing surface. Preferably, developer unit 38 includes donor roller 40 and electrode wires 42. Electrode wires 42 are electrically biased relative to donor roll 40 to detach toner therefrom so as to form a toner powder cloud in the gap between the donor roll and the image bearing surface. The latent image attracts toner particles from the toner powder cloud forming a toner powder image thereon. Donor roller 40 is mounted, at least partially, in the chamber of developer housing 44. The chamber in developer housing 44 stores a supply of developer material. The developer material is two component developer material having at least carrier granules with toner particles adhering triboelectrically thereto. A magnetic roller disposed interiorly of the chamber of housing 44 conveys the developer material to the donor roller. The magnetic roller is electrically biased relative to the donor roller so that the toner particles are attracted from the magnetic roller to the donor roller.

Figure 3:
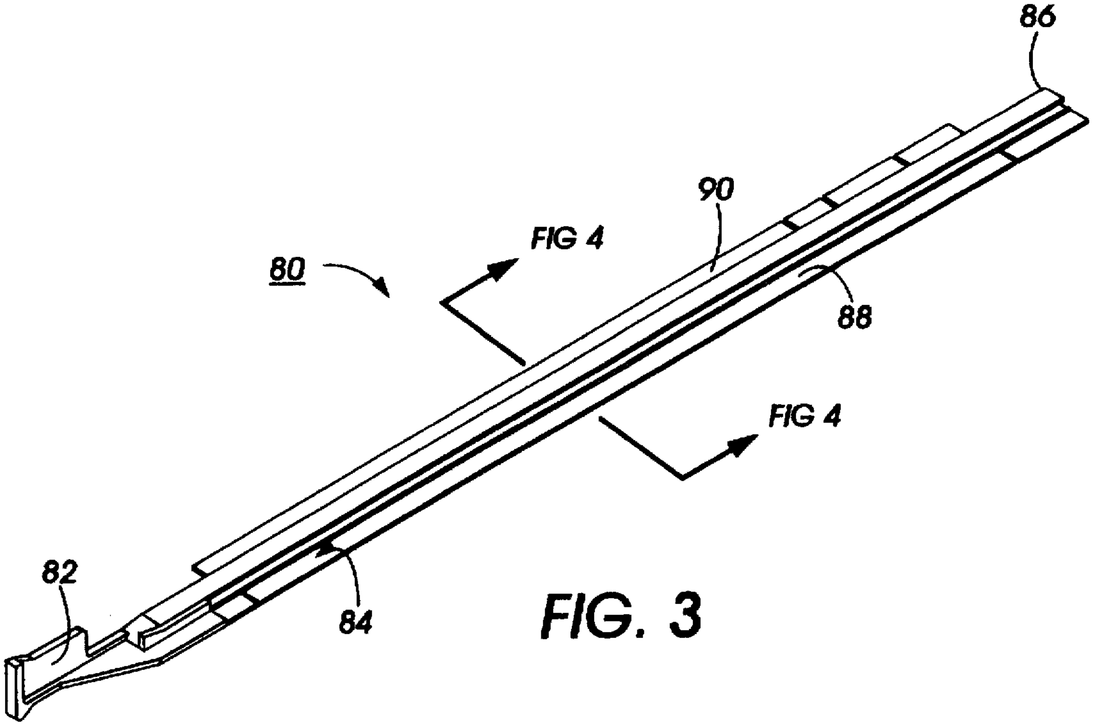
FIG. 3 is an isometric view of the blade device of the present invention.

With continued reference to FIG. 3, after the electrostatic latent image is developed, belt 10 advances the toner powder image to transfer station DD. A copy sheet 48 is advanced to transfer station DD by sheet feeding apparatus 50. Preferably, sheet feeding apparatus 50 includes a feed roll 52 contacting the uppermost sheet of stack 54. Feed roll 52 rotates to advance the uppermost sheet from stack 54 into chute 56. Chute 56 directs the advancing sheet of support material into contact with image bearing surface 12 of belt 10 in a timed sequence so that the toner powder image developed thereon contacts the advancing sheet at transfer station DD. Transfer station DD includes a corona generating device 58 which sprays ions onto the backside of sheet 48. This attracts the toner powder image from image bearing surface 12 to sheet 48.

More importantly, transfer station DD includes the multiple layered transfer assist force applying blade device 80 of the present invention (to be described in detail below). The transfer assist blade device 80 as mounted within the machine 8 is adjustable in and out relative to the copy sheet 48 by an actuator device 83 so that it applies a uniform force or load to the backside of a copy sheet 48 moving through the transfer station DD. The force or load thus applied must be precise and uniform over an increased desired life of the blade device in order to eliminate air gaps between the copy sheet and surface 12, thus effecting quality image transfer without stalling of the copy sheet and smearing of the image, as well as without image deletions.

After such transfer, sheet 48 continues to move in the direction of arrow 60 onto a conveyor (not shown) which advances sheet 48 to fusing station EE. Fusing station EE includes a fuser assembly indicated generally by the reference numeral 62 which permanently affixes the transferred powder image to sheet 48. Fuser assembly 62 includes a heated fuser roller 64 and back-up roller 66. Sheet 48 passes between fuser roller 64 and back-up roller 66 with the toner powder image contacting fuser roller 64. In this manner, the toner powder image is permanently affixed to sheet 48. After fusing, sheet 48 advances through chute 70 to catch tray 72 for subsequent removal from the reproduction machine by the operator.

After the the copy sheet is separated from image bearing surface 12 of belt 10, the residual toner particles adhering to image bearing surface 12 are removed therefrom at cleaning station FF. Cleaning station FF includes a rotatably mounted fibrous brush 74 in contact with image bearing surface 12. The particles are cleaned from image bearing surface 12 by the rotation of brush 74 in contact therewith. Subsequent to cleaning, a discharge lamp (not shown) floods image bearing surface 12 with light to dissipate any residual electrostatic charge remaining thereon prior to the charging thereof for the next successive imaging cycle.

Figure 4:
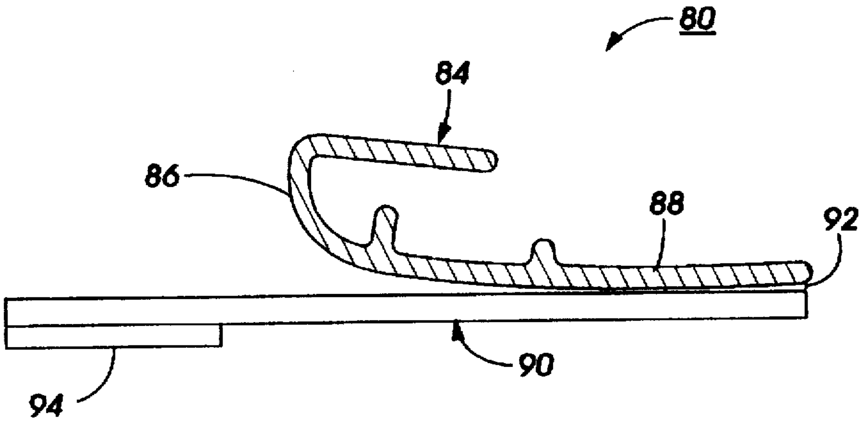
FIG. 4 is a cross-section of the blade device of FIG. 3 taken along the view line 4—4.
Figure 5:
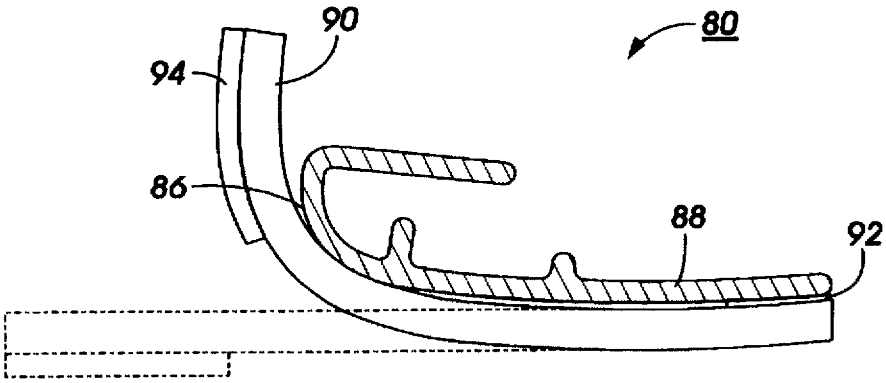
FIG. 5 is a sectional illustration of the blade device of FIG. 4 curved or bent into a force applying position.

Referring now to FIGS. 3 to 5, the reduced creep rate, and longer life, force applying multiple layers blade device 80 of the present invention is illustrated in detail. As shown, the force applying blade device includes a blade guide member 84 that is preferably made from a plastic material, and has a blade bending portion 86. The guide member 84 can also be made of metal, or of fiberglass. The guide member 84 functions to hold and secure a blade member 90 of the present invention, as the blade member is bent or curved for evenly contacting the backside of a copy sheet 48.

The blade member 90 can be attached to the guide member using adhesive shown as 92, for example. The guide member may be assembled to a handle 82 that is then mounted within the machine 8, so that the blade member can be moved, as well as adjusted in and out relative to a plane of image transfer. The in and out movement is designed to prevent damage to the photoreceptor or image bearing surface 12 at times when there is no copy sheet at the transfer station DD. The in and out adjustment on the other hand is also necessary because the blade member 90 as bent or curved about the bending portion 86, invariably tends to creep or relax over time, and thus its resulting applied force also tends to drop off proportionally with such creeping or relaxation.

The blade member 90 importantly may be comprised of a single layer or of multiple layers provided that it is designed to initially be capable, when bent at a given beginning radius of curvature, of generating a force that is greater than a high desired beginning force of a desired force range. Blade member 90 is made of a creepable material, that is a material which when subjected to a sustained load or force will exhibit a gradual nonrecoverable deforming flow or creep. For example, the blade member can be made out of a plastic spring material such as a polyester material. The blade member preferably is generally rectangular and includes a first edge for attaching, for example with adhesive 92, to the guide member 84, and a second and opposite edge for bending around the curved portion 86 of guide member 84.

The equations or formulas for a cantilever generally rectangular plastic spring blade device shows that a change in the thickness of the blade changes the applied force by its cube. As illustrated below, where "F" is force applied; "L" is the length of the force arm; "E" is a modulus of elasticity; "I" is a moment of inertia; "b" is is the with of the generally rectangular blade member; "h" is a thickness of blade member, "d" is the deflection of the blade member under force "F"; "s" (sigma) is the stress in the blade member under force "F"; and "k" is a stress concentration factor (equal approximately to one plus one-half a ratio of the thickness "h" to a radius of curvature of the blade member when applying the force "F"); the applicable equations are as follows:

$$\text{"}d\text{"}=(FL^3)/(3EI),\ \text{or}\ \text{"}d\text{"}=(4FL^3)/(Ebh^3);$$

$$\text{and "}s\text{"}=(mck)/I,\ \text{or}\ \text{"}s\text{"}=(6FLk)/(bh^2)$$

$$\text{So "}F\text{"}=(dEbh^3)/(4L^3) \tag{1}$$

$$\text{and "}s\text{"}=(3dEh)k/(2L^2) \tag{2}$$

Accordingly, it can be seen that "s" or stress is proportional to "h" (thickness) multiplied by "k", and "F" (force) is proportional to "$h^3$" (h cubed). Thus reducing the thickness "h " of a blade member or blade layer will result in a significant drop or reduction in the force produceable and in the stress level of the blade or layer, all else being equal in a given application. A reduction in the stress level thus results in a reduction in the creep rate, and hence in a longer blade life.

The blade device 80 further includes a skid member 94 that is attached to the tip end of the front of the blade member for contacting and riding against the backside of the copy sheet 48. The skid member preferably is made of a high density material such as plastic, steel or, brass. It should be relatively thin and flexible so as to make good and uniform contact with the copy sheet, and it could also be formed in the form of rollers for best wear properties in such use.

Figure 1:
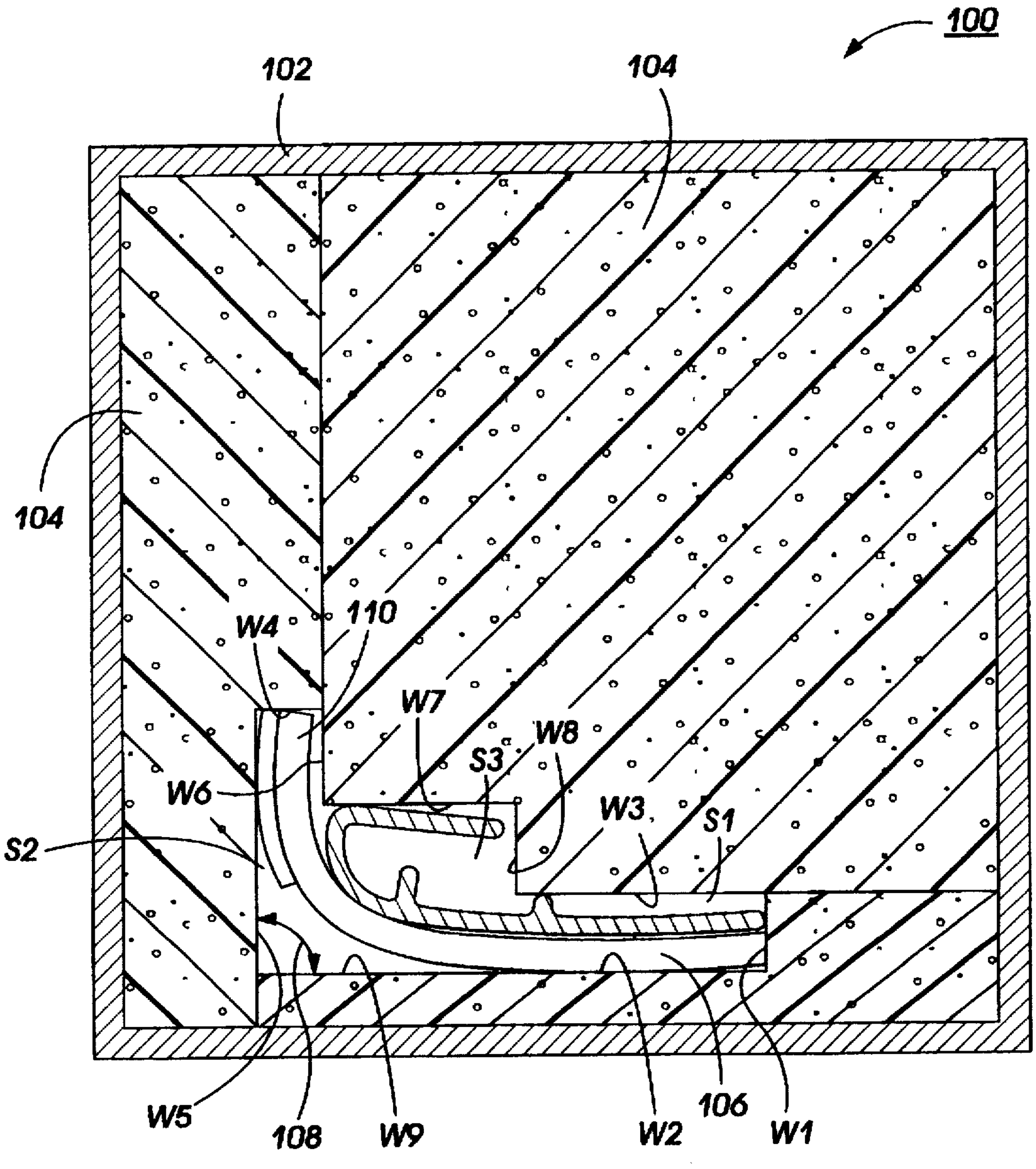
FIG. 1 is an illustrative section of the packaging apparatus and method of pre-creeping the greater than required strength blade device of the present invention.
Figure 2:
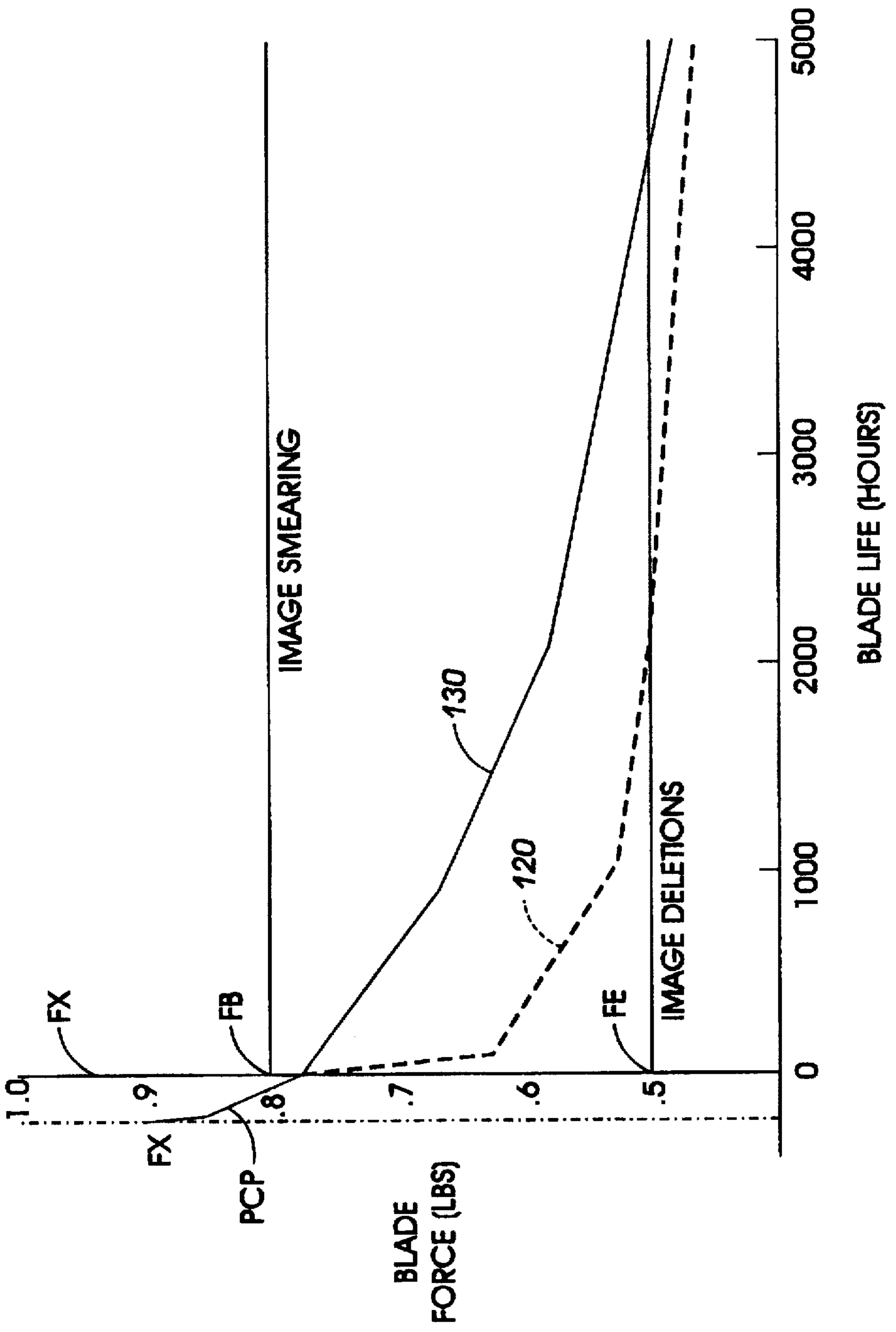
FIG. 2 is a plot illustrating a creep rate, of a blade device produced according to the method of the present invention, in terms of forces generated and the life (in hours) of the blade device.

Referring now to FIGS. 1 and 2, the method and apparatus 100 of the present invention are illustrated in detail for pre-creeping a greater than required strength blade device 80 so that when mounted for use as at the transfer station DD, it operates effectively within an otherwise lower desired force range FB (high end) to FE (low end) of the application. As shown, the apparatus is useful for pre-creeping a force applying spring blade member 90 which has characteristics (including thickness) that are suitable for ordinarily generating a higher than required initial force FX (that is greater than FB) for an application process, such as for the transfer assist blade application in the machine 8. The apparatus 100 as illustrated in FIG. 1 comprises a storable container 102 and an insert or retainer 104 that is packed and sealed within the storable container 102. As shown, the container 102 preferably is a shippable box that is rigid enough to hold the retainer 104 and a blade member 90 therein, controllably in place under a continuous force or load on the blade member 90 of the blade device 80, in order to cause creep or gradual relaxation and loss of force output potential in the blade member 90 over some controlled period of time.

It has been found that a great degree of creep in a loaded spring member such as in the blade member 90 occurs fast within the first 100 hours under load. Thereafter, the rate of creep is much slower. According to the method of the present invention therefore, it is preferable to age and precreep the packaged blade member through a precreep phase shown as PCP (FIG. 2) for about 100 hours. This thus takes the blade member 90 through its initial fast, 100-hour creep phase PCP into the much slower creep phase during process application, resulting in a much longer blade life.

The container 102 can of course be similarly designed to directly hold and retain the blade device 80 as opposite to holding and retaining the retainer 104. It is preferable then that the box should be date stamped for controlling the time period over which the blade member is allowed to creep before application in a process. The box 102 as such can be made of any suitable material, such as plastic, metal, cardboard, glass, or wood.

As also shown, the retainer 104 includes a first set of walls including w1, w2, w3 that define a first slot or opening S1 for receiving and retaining a first edge 106 of the generally rectangular spring blade member 90. The retainer 104 also includes a second set of walls including w4, w5, w6 that define a second slot or opening S2 that is in communication, and forms a creeping angle 108, with the first slot S1, for receiving and retaining a second and opposite edge 110 of the blade member 90. The retainer 104, for example, is made out of an extrudable material so as to allow for easy and precise formation of the cavities or openings S1, S2, S3. Foam material is preferred, but it must be rigid, after being shaped as desired, so as to be able to hold the blade as bent by insertion into the slots S1, S2, under a continuous force or load. As pointed out above, this causes creep or gradual relaxation and loss of force output potential in the bent blade member over some controlled period of time. Where the box or container 102 is used directly to retain the blade member, the container 102 will itself have corresponding slots such as S1 and S2 forming a blade creeping angle. For some cases, the retainer 104 can be slightly flexible or compliant at its point of contact with the bent blade member in order to result in less precreep over the same period of time as would a rigid retainer.

The blade member 90 when held bent or curved around the creeping angle 108 for a controlled period of time will tend to creep in accordance to bending force effect of the angle. Such creeping or stress relaxation results in a dropping off or reduction in the force produceable by the blade member bent at the creeping angle. The retainer 104 as shown also has a third set of walls including w7, w8, w9 that define a third opening S3 located between the first and the second slots S1, S2, for receiving and retaining the curved portion 86 of the guide member 84 around which the blade member 90 is bent to follow the creeping angle 108.

With particular reference to FIG. 2, the method of the present invention is one of increasing effective blade life in a process that requires precise forces to be applied within a desired force range, and that utilizes a spring blade member for doing so. The blade member 90 after being precreeped is set at various radii of curvature (including a beginning radius of curvature for applying a high desired beginning force FB within the desired force range, and an ending radius of curvature for applying a relatively lower desired ending force FE at the end of a useful life of the blade member). The method includes selecting a generally rectangular spring blade member 90 having characteristics for generating an out-of-range beginning force FX that is greater than the high desired beginning force FB of the desired range at a radius equal to the beginning radius of curvature in the process, for example, the image transfer process in the machine 8. The method also includes packaging the selected spring blade member into a rigid retainer 104 having a cavity S1, S2, S3 for containing the selected spring blade member, curved at a radius of curvature equal approximately to the beginning radius of curvature in the process, and aging the blade member as packaged for a significant period of time in order to allow the blade member to creep as bent.

Such creeping tends to cause its beginning force to drop from a value equal to the greater out-of-range beginning force FX thereof to a value equal to or just below, the high desired beginning force FB within the desired force range FB to FE. The method then includes mounting the aged blade member at a beginning radius of curvature within the process for initially generating a force equal to the high desired beginning force FB, and then at various other radii of curvature over a relatively increased blade life time in the process, before finally mounting it at an ending radius of curvature for generating the relatively lower desired ending force FE within the process.

After the blade member has been precreeped as above, it will (when mounted in the machine 8 at the beginning radius of curvature) immediately generate the desired but lower beginning force FB (as opposed to its designed out-of-range force FX). Advantageously, the force output of the precrept blade member 90 then tends to drop at a significantly slower rate than would a conventional blade designed to initially generate, without precreeping, only the force FB.

Still referring to FIG. 2, the curve 120 shows a plot of force vs. time in hours for a conventional 0.005" thick blade member that is designed with characteristics such that when installed without precreeping (according to the present invention) it immediately generate a forces just at or above the desired beginning force FB. Notice, how the force it generates drops and then levels out over time. The rate of the creep modulus can be calculated as a fixed value. When the force generated by the blade member drops to the FE value at 0.5 lb. for example after only about 2000 hours, the performance of the blade member is then unacceptable. This is because 0.5 lb is not enough force on the back of the copy sheet to properly transfer the image. The result is image deletions.

The curve 130 on the other hand is a plot of force vs. time in hours for a relatively stronger blade member 90, such as a 0.0055" thick blade member that is designed with characteristics for ordinarily generating a force FX that is significantly greater than FB. The blade member 90 is precreeped through the phase PCP to lower its force generating potential. When installed in a force applying process or application after precreeping according to the present invention, the blade member 90 immediately produces a force at or slightly lower than the desired beginning force FB. Note how the curve 130 is shifted upwards relative to the curve 120, and how the number of effective blade life hours is significantly increased from the 2000 hours (of a curve 120 blade) to more than 4,000 hours for the blade member 90 of the present invention. Notice also, how the force for the curve 130 starts out high at FX and drops quickly (during the precreeping phase PCP) to the lower, desired blade force range value around FB. It has been found that in as little as 100 hours, the force can be dropped by as much as 31% (in the precreeping phase PCP), but only another 11% over the next 1000 hrs.

The advantages of the method and apparatus of the present invention thus include a significantly longer blade life, no sheet stalling or image smearing upon initial installation of the greater than required strength blade member 90 after being precreeped, and a more uniform blade force.

It is, therefore, apparent that there has been provided in accordance with the present invention, a method and apparatus for precreeping a greater than required spring blade member that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of increasing effective blade life of a blade being used in a process requiring precise blade forces to be applied within a desired force range, the blade comprising a blade member bendable at various radii of curvature including a beginning radius of curvature for applying a high desired beginning force within the desired force range, and an ending radius of curvature for applying a relatively lower desired ending force at the end of a useful life of the blade member, the method comprising:

(a) selecting a generally rectangular spring blade member for generating an out-of-range beginning force greater than the high desired beginning force within the desired range at a radius equal to the beginning radius of curvature in the process;

(b) packaging the selected spring blade member into a rigid retainer having a cavity for containing the selected spring blade member curved at a radius of curvature equal approximately to the beginning radius of curvature in the process;

(c) aging the blade member as packaged for a significant period of time in order to allow the blade member to creep so as to cause its beginning force to drop from a value equal to the greater out-of-range beginning force thereof to a value equal to the high desired beginning force within the desired force range; and (d) using the aged blade member set at a beginning radius of curvature in the process for initially generating a force equal to the high desired beginning force, and using the aged blade member set at various other radii of curvature over a life time of the blade, before using it at an ending radius of curvature for generating a relatively lower desired ending force in the process.

2. The method of claim 1, wherein said selecting step comprises selecting a generally rectangular spring blade member having a thickness sufficient to result in the blade member generating an out-of-range beginning force greater than the high desired beginning force of the desired force range.

3. The method of claim 1, wherein said aging step includes date stamping a container holding the packaged blade member so as to ensure controlled aging.

* * * * *